United States Patent
Gordon, II et al.

(10) Patent No.: US 6,271,823 B1
(45) Date of Patent: Aug. 7, 2001

(54) REFLECTIVE ELECTROPHORETIC DISPLAY WITH LATERALLY ADJACENT COLOR CELLS USING A REFLECTIVE PANEL

(75) Inventors: Joseph Grover Gordon, II; Mark Whitney Hart; Sally Ann Swanson, all of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/154,284

(22) Filed: Sep. 16, 1998

(51) Int. Cl.$^7$ ............................. G09G 3/34; G02B 26/00

(52) U.S. Cl. ........................................ 345/107; 359/296

(58) Field of Search ......................... 345/107; 359/296; 204/450, 600

(56) References Cited

U.S. PATENT DOCUMENTS

| | | | |
|---|---|---|---|
| 3,612,758 | 10/1971 | Evans et al. | 178/5.4 R |
| 4,062,009 | 12/1977 | Raverdy et al. | 340/324 |
| 4,071,430 | 1/1978 | Liebert | 204/299 |
| 4,218,302 | 8/1980 | Dalisa et al. | 204/299 R |
| 4,272,596 | 6/1981 | Harbour et al. | 430/37 |
| 4,620,916 | 11/1986 | Zwemer et al. | 204/299 R |
| 4,648,956 | 3/1987 | Marshall et al. | 204/299 |
| 4,650,288 | 3/1987 | White | 350/362 |
| 4,833,464 | 5/1989 | Di Santo et al. | 340/793 |
| 5,293,528 | 3/1994 | Di Santo et al. | 345/107 |
| 5,298,833 | 3/1994 | Hou | 313/483 |
| 5,745,094 | 4/1998 | Gordon, II et al. | 345/107 |
| 5,872,552 * | 2/1999 | Gordon, II et al. | 359/296 |

FOREIGN PATENT DOCUMENTS

| | | | |
|---|---|---|---|
| 51-130241 | 11/1976 | (JP) | G02F/001/17 |
| 55-071782 | 5/1980 | (JP) | C09K/009/02 |
| 55-105227 | 8/1980 | (JP) | G02F/001/19 |
| 59-165028 | 9/1984 | (JP) | G02F/001/19 |
| 60-087317 | 5/1985 | (JP) | G02F/001/19 |
| 60-189731 | 9/1985 | (JP) | G02F/001/19 |
| 2-189525 | 7/1990 | (JP) | G02F/001/167 |
| 2-223932 | 9/1990 | (JP) | G02F/001/167 |
| 2-223933 | 9/1990 | (JP) | G02F/001/167 |
| 2-284123 | 11/1990 | (JP) | G02F/001/167 |
| 2-284128 | 11/1990 | (JP) | G02F/001/167 |
| 3-266818 | 11/1991 | (JP) | G02F/001/167 |
| 3-284729 | 12/1991 | (JP) | G02F/001/167 |
| 4-127190 | 4/1992 | (JP) | G09F/009/37 |
| 4-166917 | 6/1992 | (JP) | G02F/001/167 |
| 4-166918 | 6/1992 | (JP) | G02F/001/167 |

OTHER PUBLICATIONS

Beilin et al., "2000–Character Electrophoretic Display", SID 86 Digest, pp. 136–140.

Chiang, "Conduction Mechanism of Charge Control Agents Used in Electrophoretic Display Devices", Proceeding of the S.I.D., vol. 18, 3rd/4th Quarters 1977, pp. 275–282.

Chiang, "Electrophoretic Displays: The State of the Art", IEEE, 1980, pp. 10–12.

(List continued on next page.)

*Primary Examiner*—Richard A. Hjerpe
*Assistant Examiner*—Benjamin D. Bowers
(74) *Attorney, Agent, or Firm*—Thomas R. Berthold

(57) ABSTRACT

An ambient light reflective color electrophoretic display is comprised of a plurality of color pixels; each comprised of at least two electrophoretic cells. Each cell is comprised of a suspension of charged, black or colored light-absorbing pigment particles in a light-transmissive fluid. Each cell is also comprised of a light-transmissive front window, at least one non-obstructing counter electrode, at least one non-obstructing collecting electrode, a light-reflective panel, and a color filter medium. The cells of different colors are in a laterally adjacent relationship to each other and the charged pigment particles are responsive to the electrodes. The filter medium in each cell can be a light-transmissive color filter element or a light-reflective colored surface or the pigment suspension fluid can be colored and serve as the filter medium.

20 Claims, 6 Drawing Sheets

OTHER PUBLICATIONS

Croucher et al., "Electrophoretic Display: Materials as Related to Performance", Photographic Science and Engineering, vol. 25, No. 2, Mar./Apr. 1981, pp. 80–86.

Croucher et al., "Some Physicochemical Properties of Electrophoretic Display Materials", Ind. Eng. Chem. Prod. Res. Dev., vol. 20, No. 2, 1981, pp. 324–329.

Dalisa, "Electrophoretic Display Technology", Proceeding of the S.I.D., vol. 18, 1st Quarter 1977, pp. 43–50.

Dalisa, "Electrophoretic Display Technology", IEEE Transactions on Electron Devices, vol. ED–24, No. 7, Jul. 1977, pp. 827–834.

Dalisa, "Electrophoretic Displays", Top. Appl. Phys., vol. 40, 1990, pp. 213–232.

Fitzhenry, "Identification of a Charging Mechanism Using Infrared Spectroscopy", Applied Spectroscopy, vol. 33, No. 2, 1979, pp. 107–110.

Fitzhenry, "Optical Effects of Adsorption of Dyes on Pigment Used in Electrophoretic Image Display", Applied Optics, vol. 18, No. 19, Oct. 1, 1979, pp. 3332–3337.

Fitzhenry–Ritz, "Optical Properties of Electrophoretic Image Display", IEEE, 1980, pp. 13–25.

Fitzhenry–Ritz, "Optical Properties of Electrophoretic Image Displays", IEEE Transactions on Electron Devices, vol. ED–28, No. 6., Jun. 1981, pp. 726–735.

Hopper et al., "An Electrophoretic Display, Its Properties, Model, and Addressing", IEEE Transactions on Electron Devices, vol. ED–26, No. 8, Aug. 1979, pp. 1148–1152.

Liebert et al., "A 512 Character Electrophoretic Display", IEEE, 1980, pp. 26–30.

Murau et al., "The Understanding and Elimination of Some Suspension Instabilities in an Electrophoretic Display", Journal of Applied Physics, vol. 49, No. 9, Sep. 1978, pp. 4820–4829.

Murau, "Characteristics of an X–Y Addressed Electrophoretic Display (EPID)", SID 84 Digest, 1984, p. 141.

Novotny et al., "Optical and Electrical Characterization of Electrophoretic Displays", Journal of the Electrochemical Society, vol. 126, No. 12, Dec. 1979, pp. 2211–2216.

Shiffman et al., "An Electrophoretic Image Display with internal NMOS Address Logic and Display Drivers", Proceedings of the SID, vol. 25, No. 2, 1984, pp. 105–115.

Singer et al., "An X–Y Addressable Electrophoretic Display", Proceeding of the S.I.D., vol. 18, 3rd/4th Quarters, 1977, pp. 255–266.

Swank et al., "The Development of a Self–contained Instant–display Erasable Electrophoretic X–ray Imager", Journal of Applied Physics, vol. 50, No. 10, Oct. 1979, pp. 6534–6542.

Vance, "Optical Characteristics of Electrophoretic Displays", Proceeding of the S.I.D., vol. 18, 3rd/4th Quarters, 1977, pp. 267–274.

Novotny, "Applications of Nonaqueous Colloids",Elsevier Science Publishers B.V.,1987, pp.361–375.

Yamaguchi et al., "Equivalent Circuit of Ion Projection–driven Electrophoretic Display", IEICE Transactions, vol. E74, No. 12, Dec. 1991, pp. 4152–4156.

* cited by examiner

REFLECTIVE ELECTROPHORETIC DISPLAY WITH LATERALLY ADJACENT COLOR CELLS USING A REFLECTIVE PANEL

RELATED APPLICATION

This application is related to concurrently filed co-pending applications Ser. Nos. 09/154,119; 09/154,364; and 09/154,626.

TECHNICAL FIELD

The present invention relates to electrophoretic cells that form an electrophoretic display. In particular the invention relates to a cell configuration for use in a color electrophoretic display operating in a light-reflective mode.

BACKGROUND OF THE INVENTION

An electrophoretic cell is a cell comprised of pigment particles suspended in a fluid and uses electrophoresis to switch between the following two states:

Distributed State:

Particles are positioned to cover the horizontal area of the cell. This can be accomplished, for example, by dispersing the particles throughout the cell, by forcing the particles to form a layer on the horizontal surfaces of the cell, or by some combination of both.

Collected State:

Particles are positioned to minimize their coverage of the horizontal area of the cell, thus allowing light to be transmitted through the cell. This can be accomplished, for example, by compacting the particles in a horizontal area that is much smaller than the horizontal area of the cell, by forcing the particles to form a layer on the vertical surfaces of the cell, or by some combination of both.

The electrophoretic cell can serve as a light valve since the distributed and collected states can be made to have different light absorbing and/or light scattering characteristics. As a result, an electrophoretic cell can be placed in the light path between a light source and a viewer and can be used to regulate the appearance of a pixel in a display. The basic operation of reflective electrophoretic cells along with the examples of various electrode arrangements is described in U.S. Pat. No. 5,745,094.

Reflective color displays are known that use liquid crystals in conjunction with a fixed polarizer element to control the intensity of light reflected from each pixel. Since polarizers absorb the fraction of light whose polarization is not aligned with their active axis, and since this absorption varies with the angle of incidence, displays based on their use suffer from both limited reflectivity and viewing angle.

Other reflective color displays are known that use a solution of a dichroic dye in single or multiple layers of either a nematic or cholesteric liquid crystal material. Using a single nematic layer requires the use of a fixed polarizer element and therefore suffers from the aforementioned limitations. Using one or more cholesteric layers, or more than one nematic layer, eliminates the need for a fixed polarizer element and increases the achievable reflectivity. This approach still relies on the selective absorption of polarized light and, as a result, the contrast changes with viewing angle.

Other reflective color displays are known that use scattering liquid crystal materials, such as polymer-dispersed liquid crystal materials or scattering-mode polymer stabilized cholesteric texture materials, to control the intensity of light reflected from each pixel by switching between a turbid state and a uniform state. Since these materials only weakly scatter light in their turbid state, reflective displays based on them have a low diffuse reflectance and therefore also suffer from low brightness.

Other reflective color displays are known that use reflecting liquid crystal materials, such as reflective-mode polymer-stabilized cholesteric texture materials or holographic-polymer-dispersed liquid crystals, to control the both the intensity and color of reflected light reflected from each pixel via diffraction effects. Since these depend on diffraction effects, it is difficult to simultaneously achieve large viewing angle, high reflectance, and angle independent color.

Reflective color electrophoretic displays have been proposed in the prior art. Japanese Patent No. JP 1267525 assigned to Toyota Jidosha KK describes an electrophoretic display having colored (blue and yellow) particles with different zeta potentials in a solution of red dye to give a multicolored (yellow, green and red) display. When a certain voltage is applied to the pixels, the yellow particles are pulled to the front transparent electrode and the viewer sees yellow. At a higher voltage, the blue particles are also pulled to the front electrode and the viewer sees green. When the particles are pulled off the transparent electrode, the colors of the particles are hidden by the dye solution and the viewer sees red.

Evans, et al., in U.S. Pat. No. 3,612,758, describe a reflective electrophoretic display having pigment particles of a single color in a contrasting dye solution. In this scheme, under the influence of an electric field, the particles migrate to a front transparent electrode and the viewer sees the color of the particles. When the field is reversed, the particles migrate away from the front transparent electrode, are hidden in the dye solution, and the viewer sees the color of the dye solution.

In the two electrophoretic display patents above, color contrast and reflectance depend on the presence or absence of particles at the front window. Since the dye solution can not be completely removed from the space between the particles when they are at the front window, displays based on this approach do not produce highly contrasted images and generally have a low reflectance.

Hou, in WO 94/28202, describes a dispersion for a reflective electrophoretic display comprised of two differently colored particles that are oppositely charged. The polarity of the voltage applied to the cell determines the polarity of the particle attracted to the front transparent electrode, and hence determines the color seen by the viewer. Since the viewer sees either one of two colors, this approach produces monochrome images and therefore has a limited color gamut.

Di Santo, et al., in U.S. Pat. No. 5,276,438, disclose a reflective electrophoretic display in which a mesh screen, disposed behind the front window and covering the viewing area of the display, is used either with or without a dyed suspension fluid to hide particles of a single color from the viewer. When the particles are positioned in front of the mesh, the viewer sees the color of the particles. When the particles are positioned behind the mesh, the viewer sees a mixture of the mesh and particle colors. As a result, the contrast produced by this approach is limited by the open area of the mesh. In addition, this approach produces monochrome images and therefore has a limited color gamut.

There is a continuing need in the art for a low-power reflective color electrophoretic display with high reflectance, high image contrast, and large color gamut. It is therefore an object of the present invention to provide a low-power, reflective color electrophoretic display having improved reflectance, image contrast, and color gamut. Other objects and advantages will become apparent from the following disclosure.

SUMMARY OF THE INVENTION

The present invention relates to a reflective electrophoretic color display. The display is intended to be viewed while illuminated from the front by ambient light and to operate without the need of a backlight. The display is comprised of many picture elements or pixels located in lateral adjacency in a plane. The pixels are comprised of two or more sub-pixels, or cells, which are also located in lateral adjacency in a plane. Each cell reflects a different color. The color of a pixel is determined by the additive mixture of the colors reflected by each of its respective cells.

Each cell is comprised of a light-transmissive front window, at least one non-obstructing counter electrode, at least one non-obstructing collecting electrode, a light-reflective panel, and a color filter medium. Each cell also contains a suspension of charged, light-absorbing pigment particles in a light-transmissive fluid.

The amount of colored light reflected by each cell is controlled by the position of the pigment particles within the cell. The position, in turn, is directed by the application of appropriate voltages to the collecting and counter electrodes. When the pigment particles are positioned in the path of the light, the light is significantly attenuated before emerging from the front window, and the viewer sees dim color or black. When the pigment particles are substantially removed from the path of the light, light can be reflected back through the front window to the viewer without significant attenuation, and the viewer sees the color transmitted by the color filter medium. The color filter medium can, for example, be a light-transmissive colored filter element, a colored light-reflecting panel, or the pigment suspension fluid itself can be colored and serve as the color filter medium.

A more thorough disclosure of the present invention is presented in the detailed description that follows and from the accompanying drawings.

DETAILED DESCRIPTION OF THE INVENTION

Figure 1A:
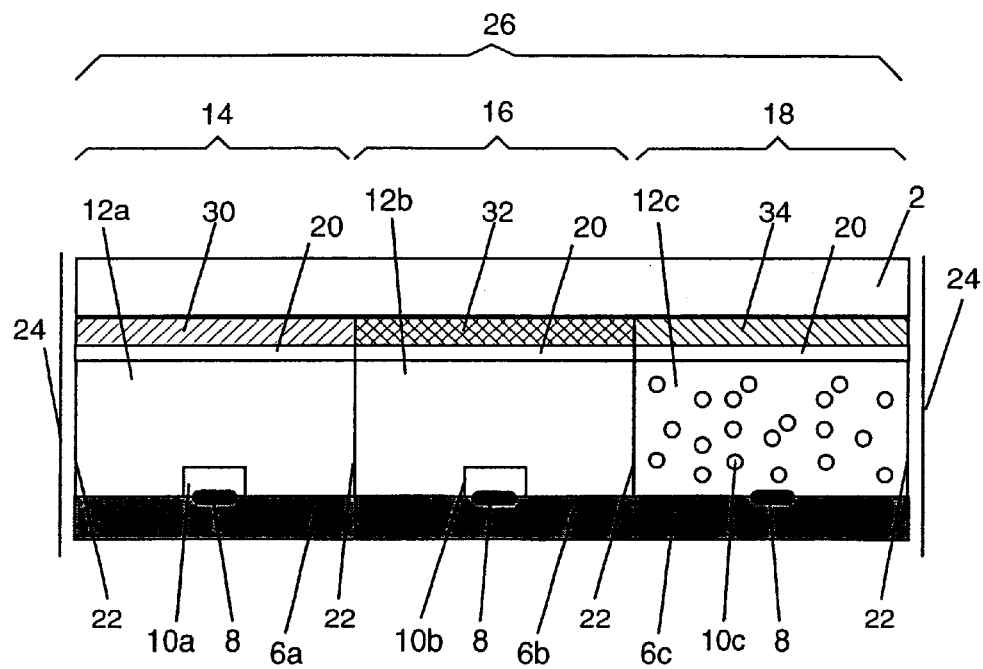
FIGS. 1a and 1b are sectional views of a first embodiment of an electrophoretic display cell of the present invention.

The present invention relates to a reflective electrophoretic color display. The display is intended to be viewed while illuminated from the front by ambient light and to operate without the need of a backlight. The display is comprised of many picture elements or pixels located in lateral adjacency in a plane. The pixels are comprised of two or more sub-pixels, or cells, which are also located in lateral adjacency in a plane. Each cell reflects a different color. The color of a pixel is determined by the additive mixture of the colors reflected by each of its respective cells.

Each cell is comprised of a light-transmissive front window, at least one non-obstructing counter electrode, at least one non-obstructing collecting electrode, a light-reflective panel, and a color filter medium. Each cell also contains a suspension of charged, light-absorbing pigment particles in a light-transmissive fluid.

The amount of colored light reflected by each cell is controlled by the position of the pigment particles within the cell. The position, in turn, is directed by the application of appropriate voltages to the collecting and counter electrodes. In the extreme these produce two states: a distributed state and a collected state. In the distributed state, the pigment particles are positioned in the path of the light so that the light is significantly attenuated before exiting the front window, and the viewer sees dim color or black. In the collected state, the particles are substantially removed from the path of the light so that light can be reflected back through the front window to the viewer without significant attenuation, and the viewer sees the color transmitted by the color filter medium.

The suspension is minimally comprised of pigment particles and a light transmissive fluid. The properties of the suspension are preferably highly stable with both time and use. The suspension is preferably highly resistant to agglomeration, flocculation, and sticking to the surfaces in the cell, even after being compacted and re-dispersed many times. The suspension preferably doesn't react with the surfaces in the cell. The specific gravity of the pigment particles and the fluid are preferably similar. The pigment particles preferably acquire a single polarity when placed in suspension.

Optionally, other components may be added to the suspension such as charge control additives, dispersants, and surfactants to improve the performance of the suspension. Suitable additives include sodium dioctylsulfosuccinate, zirconium octoate, and metal soaps such as lecithan, barium petronate, calcium petronate, alkyl succinimide, iron naphthenate, and polyethylene glycol sorbitan stearate.

The suspension fluid must transmit the color of light transmitted by the color filter medium. The fluid can be colorless or colored with either a dye and/or pigment. The fluid preferably has minimum solvent action on the pigments and does not react with the surfaces in the cell. The fluid is preferably dielectric and substantially free of ions. The fluid preferably has a low viscosity. The fluid can be a mixture of fluids. Suitable fluids include silicone fluids such as hexamethyldisiloxane, octamethyltrisiloxane, decamethyltetrasiloxane, and other poly(dimethylsiloxane)s. Suitable fluids also include hydrocarbons such as decane, dodecane, tetradecane, xylene, Sohio odorless solvent (a kerosene fraction available from Exxon Company), toluene, hexane and Isopar® C, E, G, H, K, L, M, and V and Norpar® 12, 13, and 15 (branched and linear saturated aliphatic hydrocarbons available from Exxon Company).

The pigment particles must absorb the color of light transmitted by the color filter medium. The pigment particles can be black or colored. Suitable colors include red, green, blue, cyan, magenta, yellow, or the like. Suitable classes of inorganic pigments include:

Cadmium Red
Cadmium sulfo-selenide (black)
Carbon Black
Chromium oxide (green)
Iron oxides (black)
Iron oxides (red)
Lead chromate (yellow)
Manganese dioxide (brown)
Silicon monoxide (reddish brown)
Sulfur (yellow)
Vermilion Red
Suitable classes of organic pigments include:
Anthracene (fluorescent blue, fluorescent yellow)
Anthraquinone (blue, red, yellow)
Azonaphthols (magenta)
Azopyridone (yellow)
Heterocyclic Azo (cyan, magenta)
Methine (yellow)
Nigrosines (black)
Phthalocyanine (blue, green, cyan)
Quinacridone (magenta)
Suitable opaque pigment particles include:
Anric Brown (C.I. Pigment Brown 6)
Cabot Mogul L (black)
C.l. Direct Yellow 86
C.l. Direct Blue 199 (cyan)
C.l. Food Black 2
Dalama® Yellow (Pigment Yellow 74)
Hansa® Yellow (Pigment Yellow 98)
Indo® Brilliant Scarlet (Pigment Red 123)
Monastral® Green G (C.l. Pigment Green 7)
Monastral® Blue B (C.l. Pigment Blue 15)
Monastral® Blue G (C.l. Pigment Blue 15)
Monastral® Green B (C.l. Pigment Green 7)
Paliotol® Black L0080 (C.l. Pigment Black 1)
Permanent Rubine F6Bl3-1731 (Pigment Red 184)
Pigment Scarlett (C.l. Pigment Red 60)
Quindo® Magenta (Pigment Red 122)
Stirling NS N 77Y (Pigment Black 7)
Toluidine Red B (C.l. Pigment Red 3)
Toluidine Red Y (C.l. Pigment Red 3)
Toluidine Yellow G (C.l. Pigment Yellow)
Watchung® Red B (C.l. Pigment Red 48)

Other suitable pigment particles will be known to those skilled in the art such as those disclosed in U.S. Pat. Nos. 5,200,289 and 4,631,244.

The collecting and counter electrodes in each cell are constituted or sized or positioned to be non-obstructing. This means that in the collected state, neither the particle coated collecting electrode nor the counter electrode unacceptably interferes with the passage of the desired color of light as it travels through the cell, i.e. substantially all of the incident light of the desired color is reflected from the cell. A non-obstructing collecting electrode can be realized by allowing it to occupy only a small fraction of the horizontal area of the cell by, for example, forming it into a narrow line or a small pedestal. It can also be realized by disposing it along a vertical wall in the cell. A non-obstructing counter electrode can be realized similarly or, alternatively, by coating the inside surface of the front window or the rear panel with a layer of conductive, light-transmissive material such as indium tin oxide. Alternatively, a rear panel with a light reflecting metallic surface can also serve as the counter electrode.

There can be one or more non-obstructing collecting electrodes and one or more non-obstructing counter electrodes in each cell and either electrode can be common to more than one cell. The electrodes are preferably good conductors (e.g. aluminum, chromium, copper, nickel), can be light transmissive (e.g. indium tin oxide), and can be disposed vertically and/or horizontally in the cell.

Various electrode arrangements for a reflecting electrophoretic cell are described in U.S. Pat. No. 5,745,094, which is incorporated herein by reference.

The light reflective panel can be colored or colorless provided it reflects the color of light transmitted by the color filter medium. The panel can be mirrored to reflect all visible wavelengths (e.g. coated with aluminum, chromium, or silver), or mirrored to reflect selected visible wavelengths (e.g. coated with a dielectric stack). Alternatively, the panel can be pigmented white or can be colored with either a pigment or a dye. The panel preferably has a high reflectivity for the color of light transmitted by the color filter medium. The reflected light is preferably diffused either by the reflective panel itself or by a separate element.

The color filter medium selects the color reflected by each cell. The color filter medium can, for example, be a light-transmissive colored filter element disposed across the horizontal area of the cell, either above the suspension or below the suspension on top of the light-reflecting panel. An appropriately colored pigment suspension fluid, a colored light-reflecting panel, a color diffuser, or a painted surface can also serve as the color filter medium.

The following example is a detailed description of a display of the present invention. The details fall within the scope of, and serve to exemplify, the more general description set forth above. The example is presented for illustrative purposes only, and is not intended as a restriction on the scope of the invention.

Referring to FIGS. 1a and 1b through 6a and 6b there are illustrated preferred embodiments of electrophoretic display cells in accordance with the present invention. Each cell 14, 16, and 18 generally comprises a front light-transmissive window 2, a horizontal rear panel 4, and a respective light-reflective surface 6a, 6b, and 6c facing the front window 2. Each cell 14, 16, 18 has a non-obstructing collecting electrode 8 and a light-transmissive counter electrode 20 disposed within the cell and spaced apart as illustrated. Each cell 14, 16, and 18 also has a suspension comprised of pigment particles 10a, 10b, and 10c, respectively, in a light-transmissive fluid 12a, 12b, and 12c, respectively, in the space between the counter electrode 20 and the respective light-reflective surface 6a, 6b, and 6c. The light-transmissive fluids 12a, 12b, 12c in cells 14, 16, and 18, respectively, are separated by barriers 22.

Electrophoretic cell 14 is associated with a red filter medium, electrophoretic cell 16 is associated with a green filter medium, and electrophoretic cell 18 is associated with a blue filter medium. The three laterally adjacent cells 14, 16, and 18 create an electrophoretic reflective color pixel 26. There are also shown two walls 24 to figuratively demarcate the sides of each pixel 26. These side pixel walls 24 are shown for illustrative purpose and may not be present in the actual embodiment.

In the embodiments illustrated in FIGS. 1a and 1b through 6a and 6b, the collecting electrodes 8 represent individually addressable conducting lines whose horizontal area is much smaller than the horizontal area of the cell. The counter electrode 20 represents a light-transmissive conductor and is shared by all the cells 14, 16, and 18 in the pixel 26. The distributed state of the cells 14, 16, and 18 are illustrated as one in which the respective particles 10a, 10b, and 10c are generally uniformly dispersed throughout their respective suspension fluids 12a, 12b, 12c. The collected state of the cells 14, 16, and 18 are illustrated as one in which the particles have accumulated on their respective collecting electrodes 8, as shown for example, by cell 18 in FIG 1*a* and cells 14 and 16 in FIG. 1*b*.

Figure 1B:
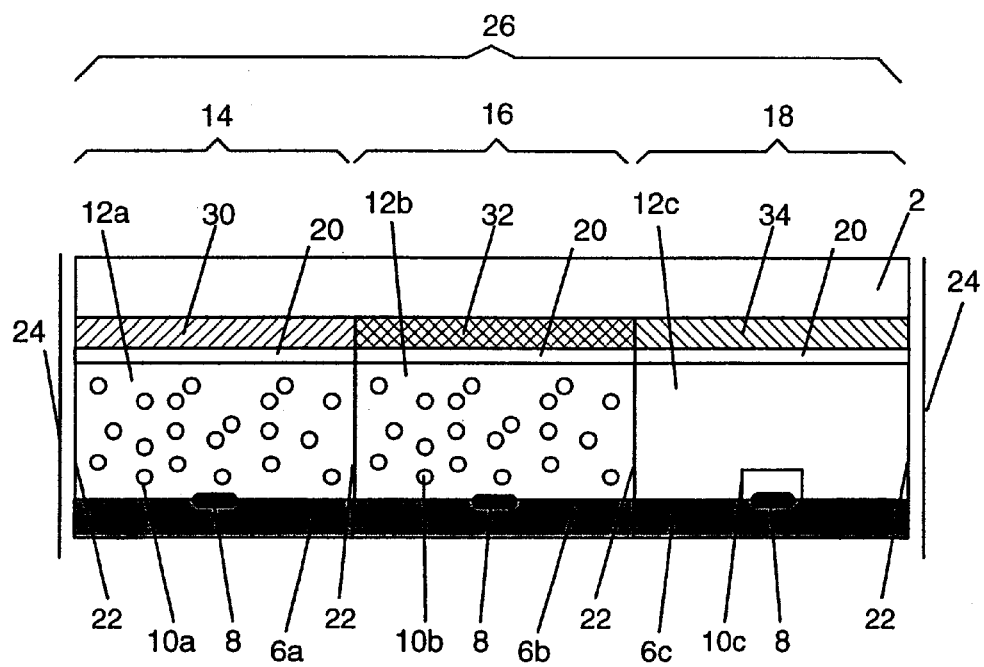

The arrangement of FIGS. 1*a* and 1*b* includes a red filter element 30 in cell 14, a green filter element 32 in cell 16, and a blue filter element 34 in cell 18. These light-transmissive filter elements 30, 32, 34 are respectively located across the lower surface of the front window 2, between the front window 2 and the counter electrode 20, and are in lateral adjacency in a plane with each other. In both FIGS. 1*a* and 1*b* the pigment particles 10*a*, 10*b*, and 10*c* are black.

In FIG. 1*a*, cells 14 and 16 are shown in the distributed state. Since the black absorbing particles 10*a* and 10*b* are distributed over the horizontal area of these cells, incident ambient light transmitted by the filters 30 and 32 is substantially absorbed before it reaches the viewer. Consequently, cells 14 and 16 appear black to the viewer.

Cell 18 of FIG. 1*a* is shown in the collected state. Since the black absorbing particles 10*c* are collected in a small horizontal area of this cell, and since the suspension fluid 12*c* transmits the color of light transmitted by the filter 34, incident ambient light transmitted by the blue filter 34 can both substantially reach and reflect from the reflective surface 6*c* back to the viewer.

Consequently, cell 18 appears blue to the viewer. Since cells 14 and 16 reflect substantially no light and cell 18 reflects blue light, the pixel 26 will appear blue to the viewer.

FIG. 1*b* shows the complementary state of FIG. 1*a*—cells 14 and 16 are in the collected state and cell 18 is in the distributed state. As a result, cells 14 and 16 will reflect red and green light, respectively, and cell 18 will reflect substantially no light. Consequently, the pixel 26 reflects both red and green light and will appear yellow to the viewer.

Figure 2A:
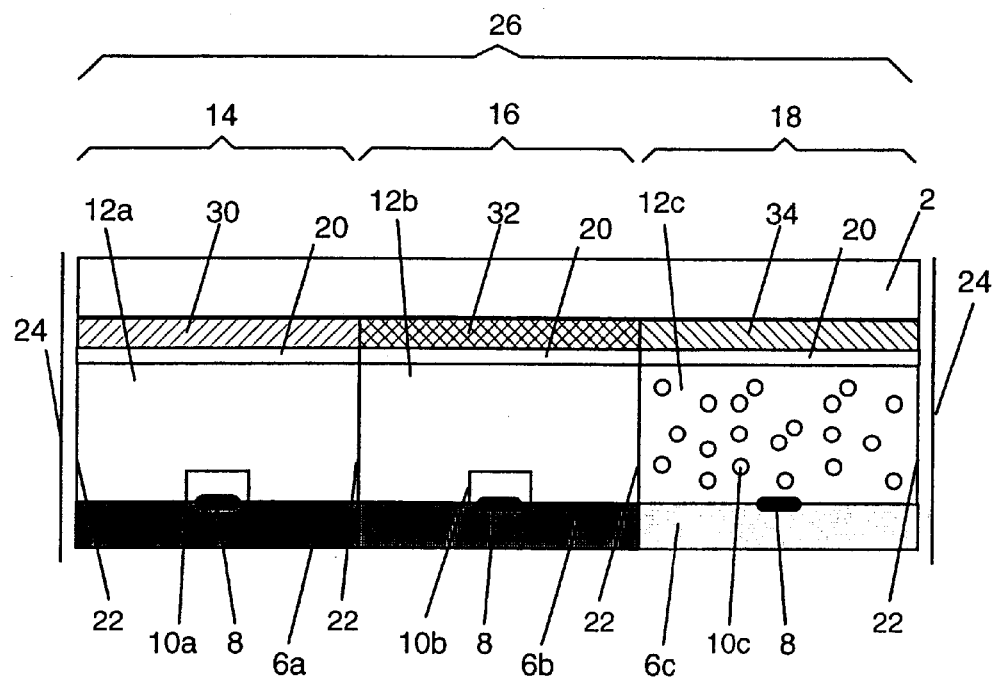
FIGS. 2a and 2b are sectional views of a second embodiment of an electrophoretic display cell of the present invention.
Figure 2B:
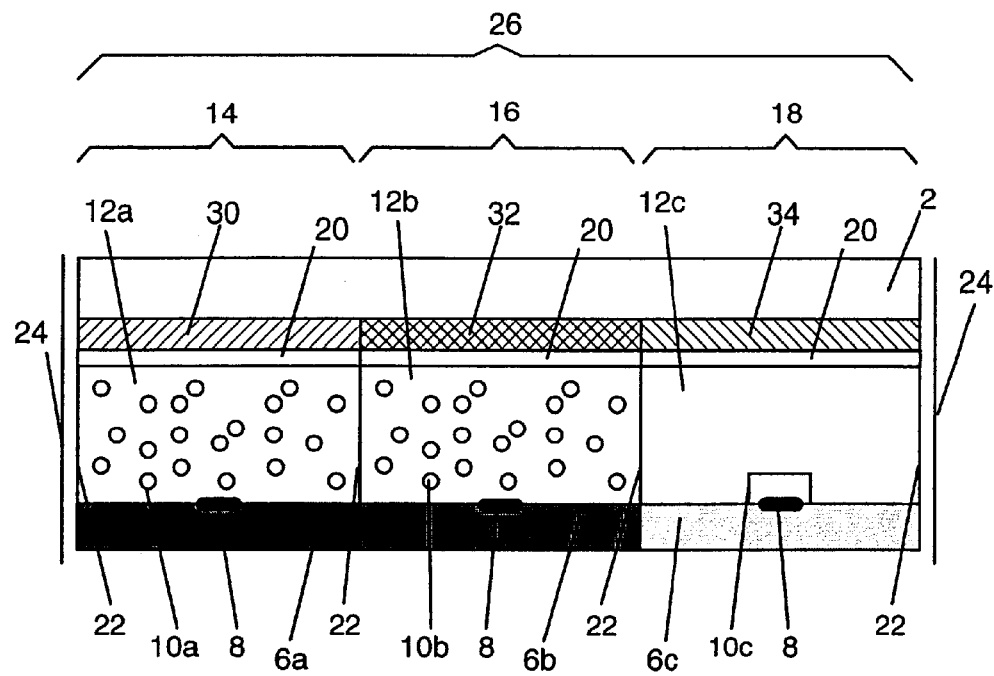

FIGS. 2*a* and 2*b* illustrate an arrangement similar to that illustrated in FIGS. 1*a* and 1*b*. The difference is that instead of using black pigment particles 10*a*, 10*b*, and 10*c*, the pigment particles 10*a* associated with the red filter 30 in cell 14 are cyan, the pigment particles 10*b* associated with the green filter 32 in cell 16 are magenta, and the pigment particles associated with the blue filter 34 in cell 18 are yellow. Since the respective pigment colors are complementary to their associated filter colors, the pigment particles absorb the color of light transmitted by their associated color filter so that the cell, in its distributed state, will reflect substantially no light.

Figure 3A:
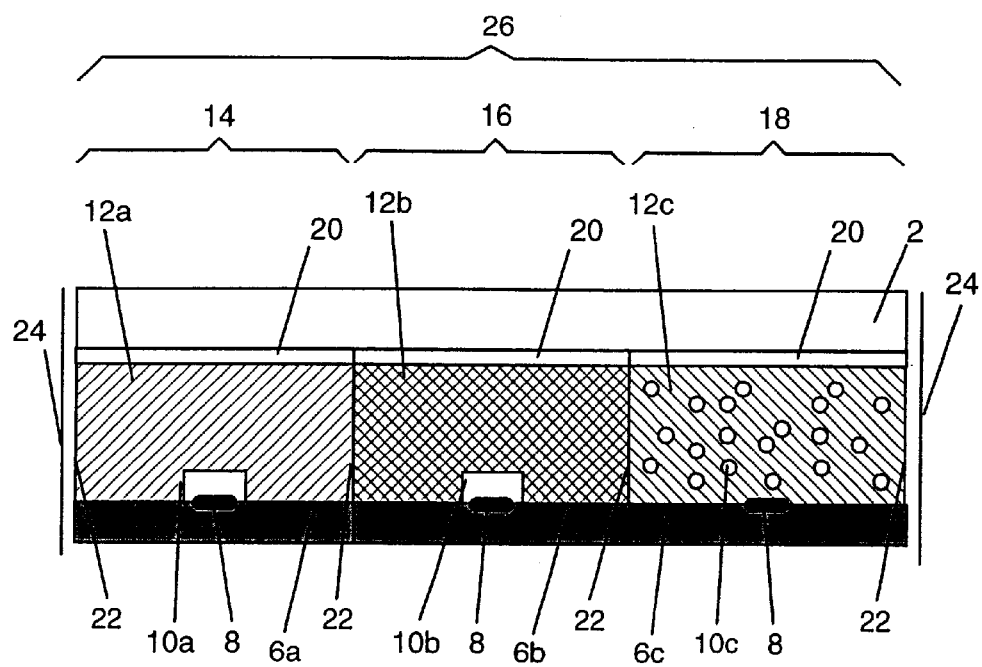
FIGS. 3a and 3b are sectional views of a third embodiment of an electrophoretic display cell of the present invention.
Figure 3B:
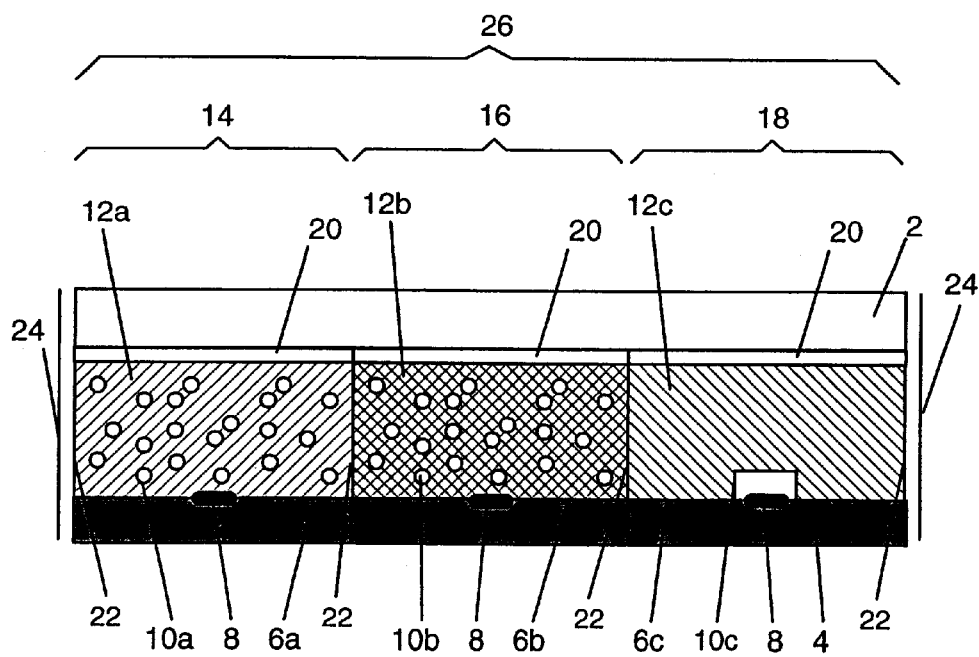

In the arrangement illustrated in FIGS. 3*a* and 3*b*, the filter medium is constituted by a red colored suspension fluid 12*a* in cell 14, a green colored suspension fluid 12*b* in cell 16, and a blue colored suspension fluid 12*c* in cell 18. There are no separate filter elements 30, 32, and 34. The pigment particles 10*a*, 10*b*, and 10*c* are black and therefore absorb the color of the light transmitted by the colored suspension fluid. In the distributed state, the particles absorb the color of the light transmitted by the colored fluid, and the cell appears dark or black. In the collected state, light can both reach and emerge from the respective light-reflecting surface 6*a*, 6*b*, 6*c* and the color of the respective suspension fluid 12*a*, 12*b*, 12*c* in the cells 14,16, 18 is reflected.

Figure 4A:
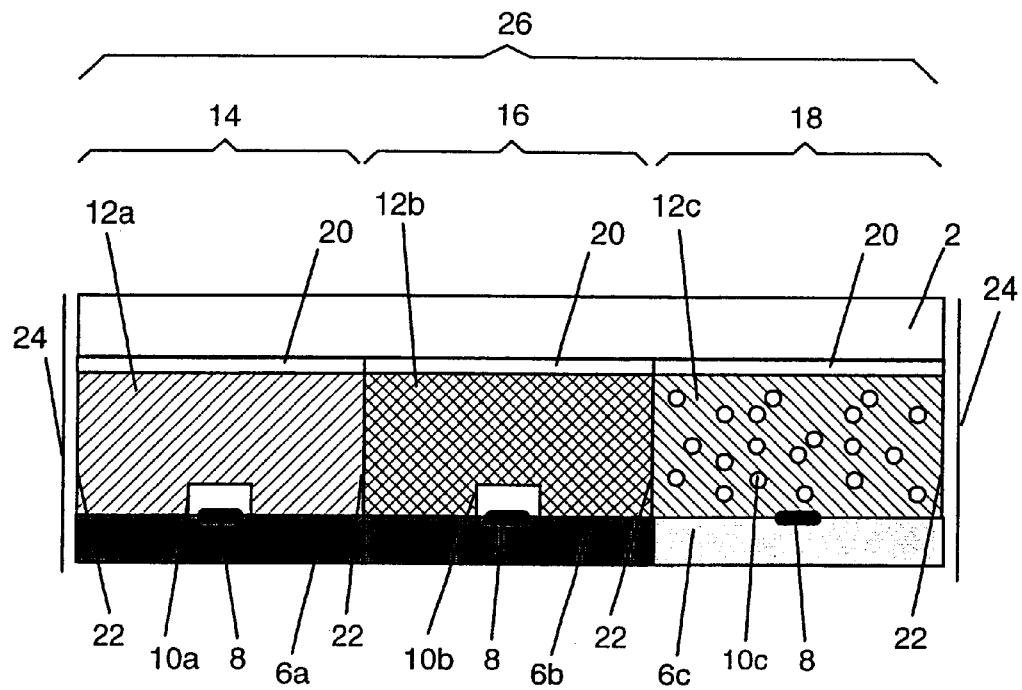
FIGS. 4a and 4b are sectional views of a fourth embodiment of an electrophoretic display cell of the present invention.
Figure 4B:
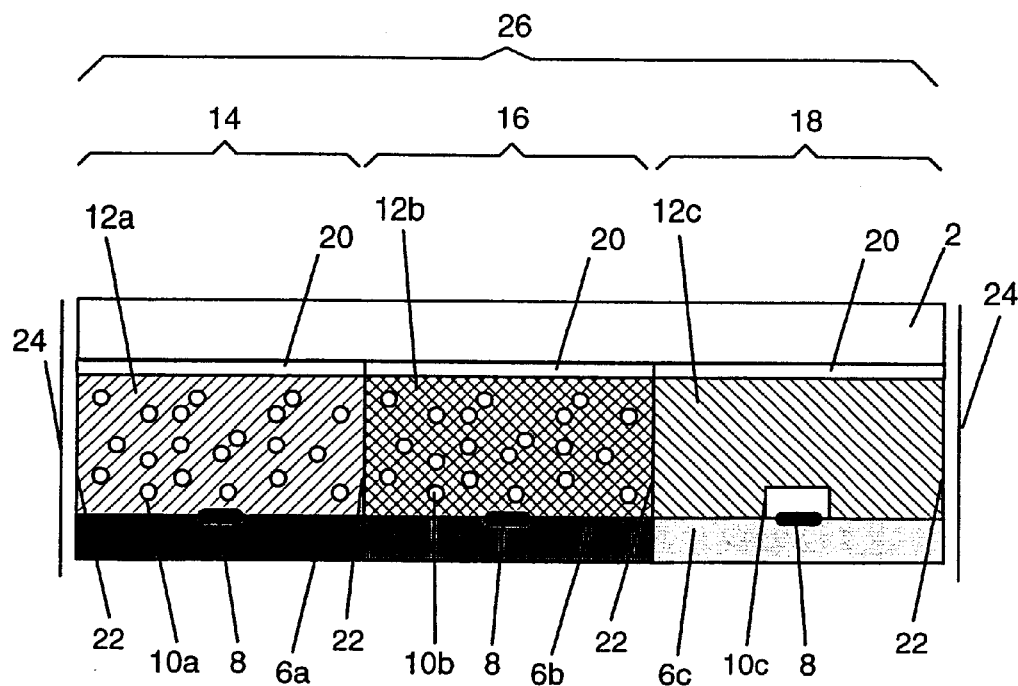

The arrangement illustrated in FIGS. 4*a* and 4*b* is similar to that illustrated in FIGS. 3*a* and 3*b*. The difference is that instead of using black pigments particles 10*a*, 10*b*, and 10*c*, the pigment particles 10*a* associated with the red suspension fluid 12*a* in cell 14 are cyan, the pigment particles 10*b* associated with the green suspension fluid 12*b* in cell 16 are magenta, and the pigment particles 10*c* associated with the blue suspension fluid 12*c* in cell 18 are yellow. Since the respective pigment colors are complementary to their associated suspension fluid colors, the pigment particles absorb the color of light transmitted by their associated suspension fluid so that the cell, in its distributed state, will reflect substantially no light. In this case, for maximum visual contrast, the distributed state is preferably one that prevents the viewer from directly seeing the particles. For example, the distributed state in this case is preferably not one in which the particles are distributed in a slab along the surface of the counter electrode 20.

Figure 5A:
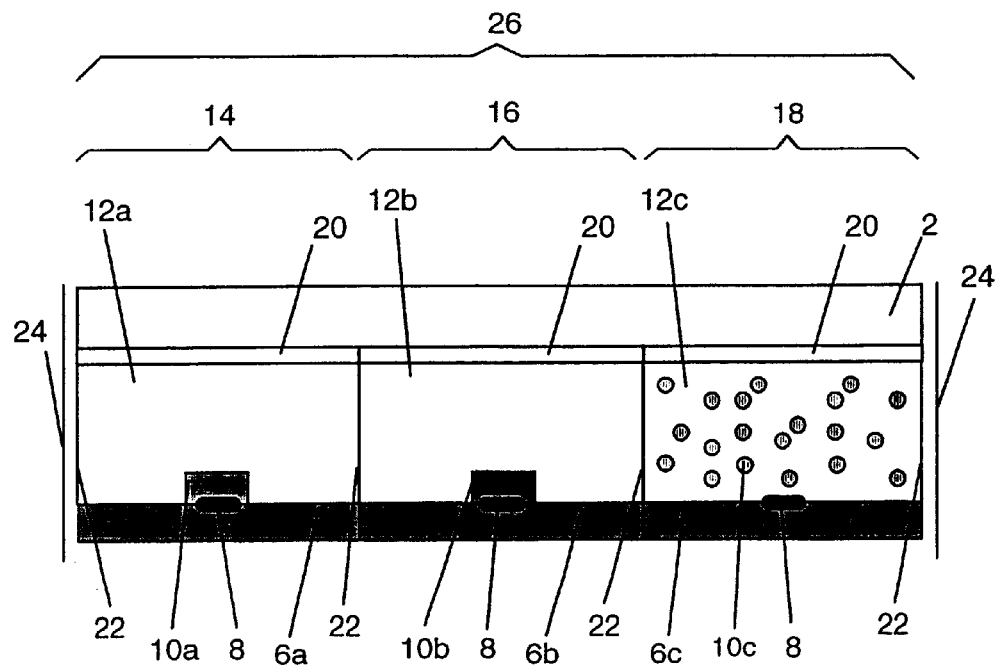
FIGS. 5a and 5b are sectional views of a fifth embodiment of an electrophoretic display cell of the present invention.
Figure 5B:
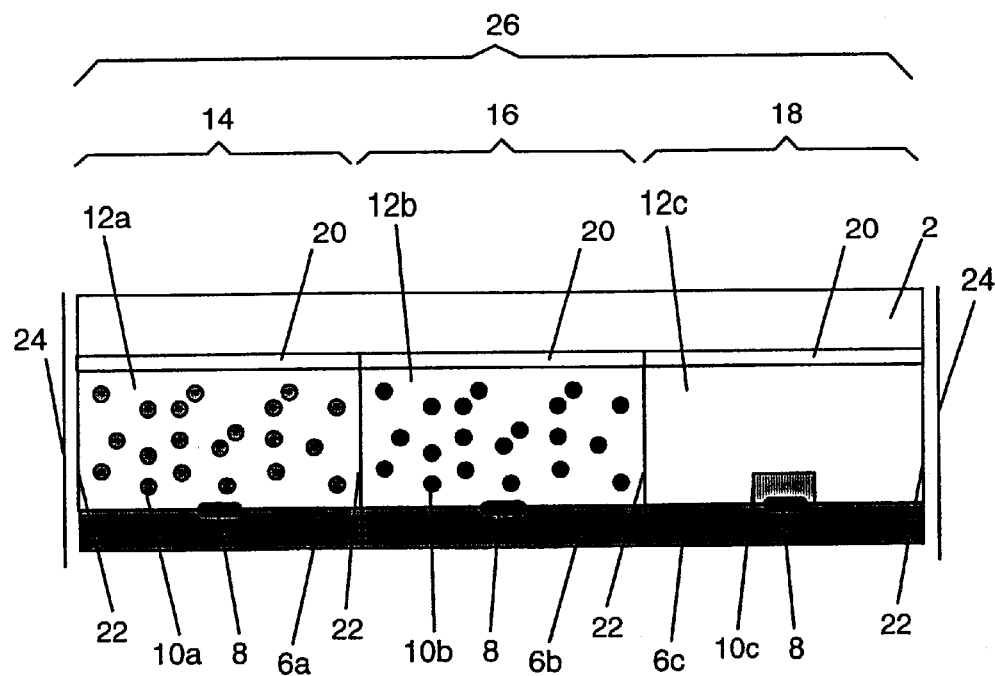

In the arrangement illustrated in FIGS. 5*a* and 5*b*, the filter medium is constituted by a light-reflecting surface 6*a* in cell 14 that only reflects red light, a light-reflecting surface 6*b* in cell 16 that only reflects green light, and a light-reflecting surface 6*c* in cell 18 that only reflects blue light. The pigment particles 10*a*, 10*b*, and 10*c* are black and therefore absorb the color of the light reflected by the colored surface. In the distributed state, the particles absorb the color of the light reflected by the colored surface, and the cell appears dark or black. In the collected state, light can both reach and emerge from the respective light-reflecting colored surface 6*a*, 6*b*, 6*c* and the color of the respective light-reflecting colored surface 6*a*, 6*b*, 6*c* in the cells 14, 16, 18 is reflected.

Figure 6A:
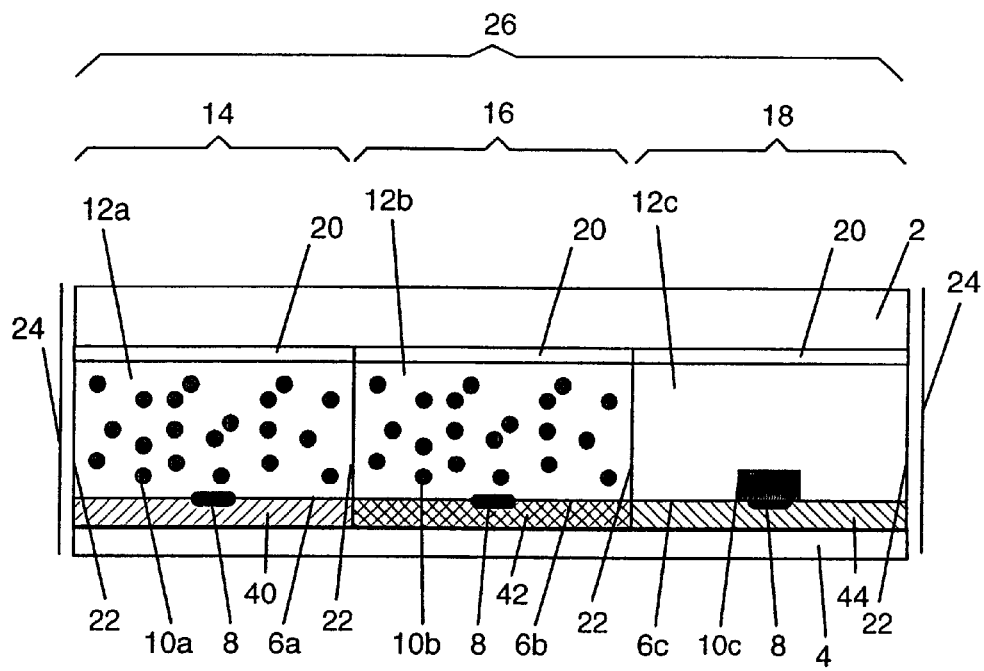
FIGS. 6a and 6b are sectional views of a sixth embodiment of an electrophoretic display cell of the present invention.
Figure 6B:
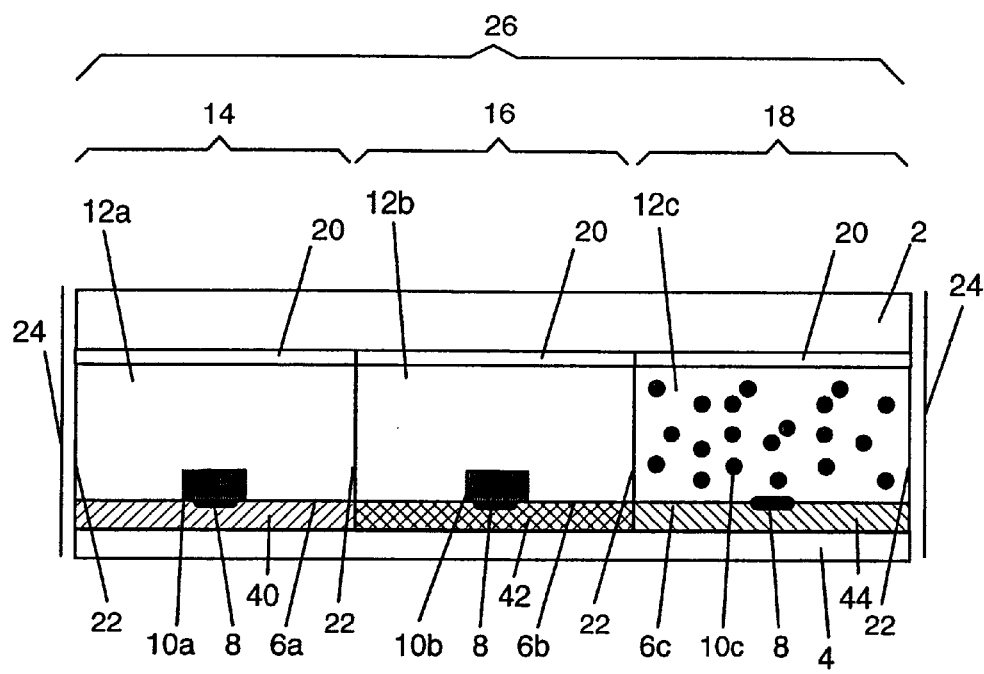

The arrangement illustrated in FIGS. 6*a* and 6*b* is similar to that illustrated in FIGS. 5*a* and 5*b*. The difference is that instead of using black pigments particles 10*a*, 10*b*, and 10*c*, the pigment particles 10*a* associated with the red reflecting surface 6*a* in cell 14 are cyan, the pigment particles 10*b* associated with the green reflecting surface 6*b* in cell 16 are magenta, and the pigment particles 10*c* associated with the blue reflecting surface 6*c* in cell 18 are yellow. Since the respective pigment colors are complementary to their associated colored surface colors, the pigment particles absorb the color of light reflected by their associated colored surface so that the cell, in its distributed state, will reflect substantially no light. In this case, for maximum visual contrast, the pigment particles preferably do not substantially scatter or reflect light.

Although this invention has been described with respect to specific embodiments, the details thereof are not to be construed as limitations for it will be apparent that various embodiments, changes, and modifications may be resorted to without departing from the spirit and scope thereof. Further, it is understood that such equivalent embodiments are intended to be included within the scope of this invention.

For example, other embodiments of this invention can use different color combinations for the cells within the pixel. As another example, the particles in FIGS. 2*a*–2*b*, 4*a*–4*b*, and 6*a*–6*b* need not be a color complementary to the color of their associated color filter medium, they need only be a color that absorbs the color of light transmitted by their associated color filter medium.

In addition, some components in the illustrations above may not be necessary or could be modified in other embodiments. For example, in the embodiments illustrated in FIGS. 1*a*–1*b*, and in FIGS. 5*a*–5*b*, the barriers 22 are not necessary - the cells 14, 16, and 18 can share the same suspension. In the embodiments illustrated in FIGS. 2*a*–2*b*, and in FIGS. 6*a*–6*b*, the barriers 22 need only be impervious to the pigment particles - the cells 14, 16, and 18 can share the same suspension fluid.

What is claimed is:

1. An electrophoretic display having a plurality of cells disposed between a light-transmissive front window and a reflective rear panel, comprising:

multiple pixels each formed by multiple cells in a lateral adjacent arrangement relative to each other, each adjacent cell being between the front window and the reflective rear panel, and each cell containing charged, light-absorbing pigment particles in a light-transmissive fluid;

a non-obstructing collecting electrode to substantially remove pigment particles in the respective cells from the path of light through the cell;

a non-obstructing counter electrode cooperating with the collecting electrode to distribute the pigment particles in the respective cells to substantially block the path of light from the light source; and a color filtering medium for each respective cell, and wherein in three adjacent cells of each pixel, respectively, the color filter medium is red and the associated particles are cyan, the color filter medium is green and the associated particles are magenta, and the color filter medium is blue and the associated particles are yellow.

2. An electrophoretic display having a plurality of cells disposed between a light-transmissive front window and a reflective rear panel, comprising:

multiple pixels each formed by three cells in a lateral adjacent arrangement relative to each other and each cell being between a light transmissive front window and a light-reflecting rear panel;

each cell containing charged, light-absorbing pigment particles in a light-transmissive fluid;

a non-obstructing collecting electrode to substantially remove pigment particles in the respective cells from the path of light so that light can pass through the cell without significant attenuation;

a non-obstructing counter electrode, cooperating with the collecting electrode to distribute the pigment particles in the respective cells to substantially block the path of light; and in each pixel, a red color filter element located across the window in a first one of the cells, a blue color filter element located across the window in a second one of the cells, and a green color filter element located across the window in a third one of the cells.

3. An electrophoretic display as claimed in claim 2 wherein the particles are a color that absorbs the color transmitted by the color filter element.

4. An electrophoretic display as claimed in claim 2 wherein the particles are black or colored and wherein the fluid is substantially light-transmitting.

5. An electrophoretic display as claimed in claim 2 wherein the particles are a color complementary to the color of the filter element.

6. An electrophoretic display comprising:

a light-transmissive front window and a parallel, spaced-apart reflective rear panel, the front windows and rear panels defining a group of color cells disposed in a lateral adjacent relationship relative to each other to form a pixel;

a different colored light-transmissive fluid disposed between the front window and the reflective rear panel in each respective cell of the pixel, thereby forming a respective color filter medium for the respective cell;

a suspension including charged, light-absorbing pigment particles in the colored light-transmissive fluid of each cell;

a non-obstructing collecting electrode associated with each cell, which acts to substantially remove pigment particles from the light path so that light traversing the colored fluid can reach the reflective rear panel and emerge from the front window without significant attenuation; and a non-obstructing counter electrode associated with each cell, which acts to position the pigment particles to substantially block the path of light so that light traversing the colored fluid is significantly attenuated before emerging from the front window, and wherein the respective collecting electrode and the respective counter electrode act in concert for respective cells to thereby position the particles in the respective cells.

7. An electrophoretic display as claimed in claim 6 wherein the particles are a color that absorbs the color transmitted by the colored light-transmissive fluid.

8. An electrophoretic display as claimed in claim 6 wherein the particles are black or colored.

9. An electrophoretic display as claimed in claim 6 wherein the particles are a color complementary to the color of the colored light-transmissive fluid.

10. An electrophoretic display as claimed in claim 6 wherein in three adjacent cells of each pixel, respectively, the colored light-transmissive fluid is red and the associated particles are cyan, the colored light-transmissive fluid is green and the associated particles are magenta, and the colored light-transmissive fluid is blue and the associated particles are yellow.

11. An electrophoretic display having a plurality of cells, each disposed between a light-transmissive front window and a reflective rear panel, a group of cells acting to form a pixel, the display comprising:

a red color fluid cell, a green color fluid cell, and a blue color fluid cell located in lateral adjacency relative to each other;

a suspension in each color fluid cell including charged, light-absorbing pigment particles in the colored fluid, the fluid being a light-transmissive fluid;

non-obstructing collecting electrodes, at least one associated with each color cell, which act to substantially remove pigment particles from the light path so that light can pass through the cell without significant attenuation; and non-obstructing counter electrodes, at least one associated with each color cell, which act to position the pigment particles to substantially block the path of light so that light is significantly attenuated before emerging from the front window, and wherein the respective collecting electrodes and the respective non-obstructing electrodes act in concert for respective cells to thereby position the particles in the respective cells.

12. An electrophoretic display comprising a plurality of cells having a light-transmissive front window and a reflective rear panel, and wherein a pixel comprises three individual cells, the cells being in lateral adjacency relative to each other:

a) the first cell comprising a suspension of charged pigment particles in a first colored fluid, the first colored fluid serving to act as a first color filter and the pigment particles absorbing the visible light not absorbed by the first colored fluid;

b) the second cell comprising a suspension of charged pigment particles in a second colored fluid, the second colored fluid serving to act as a second color filter and the pigment particles absorbing the visible light not absorbed by the second colored fluid;

c) the third cell comprising a suspension of charged pigment particles in a third colored fluid, the third colored fluid serving to act as a third color filter and the pigment particles absorbing the visible light not absorbed by the third colored fluid; and wherein d) each cell includes:
   (i) a non-obstructing collecting electrode acting to substantially remove pigment particles from the path of light through the colored fluid so that the color of the fluid is visible to the viewer, and
   (ii) a non-obstructing counter electrode cooperating with the collecting electrode to position the pigment particles in the path of light through the colored fluid so that the color of the fluid is not visible to the viewer.

13. A display as claimed in claim 12 wherein the first cell comprises a suspension of charged, black pigment particles in a red fluid, the second cell comprises a suspension of charged, black pigment particles in a green fluid, and the third cell comprises a suspension of charged, black pigment particles in a blue fluid.

14. A display as claimed in claim 12 wherein the first cell comprises a suspension of charged, cyan pigment particles in a red fluid, the second cell comprises a suspension of charged, magenta pigment particles in a green fluid, and the third cell comprises a suspension of charged, yellow pigment particles in a blue fluid.

15. An electrophoretic display comprising a plurality of cells in a lateral adjacent arrangement and containing a suspension of charged, light-absorbing pigment particles in a light-transmissive fluid, each cell comprising:

a light-transmissive front window;

a rear panel having a light-reflective surface;

a respective color filter element associated with the reflective rear panel for each cell;

a non-obstructing collecting electrode, disposed relative to the front window and the reflective rear panel, the collecting electrode acting to substantially remove pigment particles from the path of light so that light can reach and reflect from the rear panel and emerge from the front window without significant attenuation;

a non-obstructing counter electrode acting to position the pigment particles to substantially absorb ambient light traversing the cell and thereby substantially prevent the light from emerging from the front window; and wherein the cells each respectively contain a suspension of charged, pigment particles that absorb the color of the light transmitted by the color filter element.

16. A display as claimed in claim 15 wherein the pigment particles are black, and the filter element for respective cells are red, green, and blue.

17. A display as claimed in claim 15 wherein the colors of the filters and the respective colors of the particles are complementary.

18. A display as claimed in claim 15 wherein, in three adjacent cells, respectively, the colored pigment particles are cyan and the associated filter element is red, the colored pigment particles are magenta and the associated filter element is green, and the colored pigment particles are yellow and the associated filter element is blue.

19. A display as claimed in claim 15 wherein the filter elements for respective cells are incorporated as part of the reflective rear panel.

20. A display as claimed in claim 15 wherein the filter elements for respective cells are colored and reflective rear panel elements.

* * * * *